(12) United States Patent
Newman

(10) Patent No.: US 9,014,940 B2
(45) Date of Patent: Apr. 21, 2015

(54) HYBRID VEHICLE CONTROL METHODS

(71) Applicant: Kevin Andrew Newman, Milan, MI (US)

(72) Inventor: Kevin Andrew Newman, Milan, MI (US)

(73) Assignee: The United States of America, as represented by the Administrator of the U.S. Environmental Protection Agency, Washington, DC (US)

( * ) Notice: Subject to any disclaimer, the term of this patent is extended or adjusted under 35 U.S.C. 154(b) by 21 days.

(21) Appl. No.: 13/986,112

(22) Filed: Apr. 2, 2013

(65) Prior Publication Data

US 2014/0297147 A1 Oct. 2, 2014

(51) Int. Cl.
| | | |
|---|---|---|
| *G06F 7/70* | (2006.01) | |
| *B60T 8/18* | (2006.01) | |
| *B60T 10/04* | (2006.01) | |
| *B60T 13/58* | (2006.01) | |
| *B60T 1/10* | (2006.01) | |
| *B60T 1/093* | (2006.01) | |

(52) U.S. Cl.
CPC .. *B60T 8/18* (2013.01); *B60T 1/093* (2013.01); *B60T 10/04* (2013.01); *B60T 13/585* (2013.01); *B60T 1/10* (2013.01); *B60T 2250/02* (2013.01); *B60T 2270/604* (2013.01)

(58) Field of Classification Search
CPC .... B60W 10/24; B60W 10/184; B60W 40/13
USPC .......................................... 701/70
See application file for complete search history.

(56) References Cited

U.S. PATENT DOCUMENTS

| | | | | |
|---|---|---|---|---|
| 2010/0312448 | A1* | 12/2010 | Kueperkoch et al. | 701/82 |
| 2011/0251770 | A1* | 10/2011 | Minarcin et al. | 701/71 |
| 2012/0053771 | A1* | 3/2012 | Yoshida | 701/22 |

* cited by examiner

*Primary Examiner* — James Trammell
*Assistant Examiner* — Michael D Lang
(74) *Attorney, Agent, or Firm* — David H. Read

(57) ABSTRACT

Vehicle mass is estimated in a hybrid motor vehicle. Upon determination of a significant change in vehicle mass, adjustments are made to control of the regenerative braking systems and to energy storage levels to improve fuel efficiency. Upon determination of an increase in vehicle mass, the amount of braking force applied to the vehicle by the regenerative braking system in response to brake pedal movement is increased in order to capture more braking energy before friction braking is used.

3 Claims, 5 Drawing Sheets

HYBRID VEHICLE CONTROL METHODS

CROSS-REFERENCE TO RELATED APPLICATION

This application claims priority to U.S. Provisional Application 61/619,123, "Hydraulic Hybrid Vehicle Control Methods," filed Apr. 2, 2012.

BACKGROUND OF THE INVENTION

1. Field of the Invention

This invention relates to hybrid motor vehicles and methods for their control.

2. Description of the Related Art

Hybrid vehicle powertrains are being studied as a way to improve the fuel efficiency of motor vehicles. Commonly-assigned U.S. Pat. No. 6,719,080 ("Hydraulic Hybrid Vehicle") to Gray, and commonly assigned U.S. patent application Ser. No. 13/415,109 ("Modular Hydraulic Hybrid Drivetrain"), filed Mar. 8, 2012, which are both incorporated herein by reference, describe two examples of a hydraulic hybrid powertrain for a motor vehicle utilizing a series mode of operation. The series mode of operation on a hydraulic hybrid vehicle includes an engine-driven hydraulic pump which receives working fluid from a low pressure fluid source and pressurizes the fluid to a higher pressure. A high pressure fluid line (or other fluid connection) conveys the pressurized fluid to a hydraulic motor, where the pressurized fluid drives the hydraulic motor to provide useful work. An energy storage high pressure accumulator is fluidly connected to the high pressure fluid line, to (1) receive pressurized fluid from the hydraulic pump and retain the fluid in a highly pressurized state for energy storage purposes, and (2) provide pressurized fluid as needed to drive the hydraulic motor. Hybrid electric vehicle powertrains are also well-known in the art.

Efficiency and performance of hybrid motor vehicles are highly dependent on selection of effective vehicle control methods for governing the actions and interactions of the hybrid powertrain components (e.g., engine, pump, motors, valves, accumulators, and auxiliary systems for a hydraulic hybrid) within the vehicle. There is a need for continued improvements in vehicle control methods, to further improve the efficiency and performance of hybrid motor vehicles. Optimum vehicle controls for a hybrid vehicle can be significantly affected by factors such as vehicle weight and drive cycles. It is therefore beneficial to facilitate vehicle control adjustments responsive to such factors.

OBJECT OF THE INVENTION

The object of the invention is therefore to provide enhanced vehicle control methods for improving the efficiency, performance and feel of hybrid motor vehicles, particularly those that utilize a series hydraulic mode of operation.

SUMMARY OF THE INVENTION

In one aspect of the invention, for vehicles that are expected to have significant changes in weight (e.g., due to changes in freight or loads), vehicle mass is estimated in operation and used to tune regenerative braking and other controls for best overall efficiency and driver feel for the given vehicle mass.

In another aspect of the invention, vehicle controllers are established with a modular code set-up, to facilitate simpler code improvements later for code implementation into specific vehicle types and anticipated drive cycles.

DETAILED DESCRIPTION OF THE INVENTION

Figure 1:
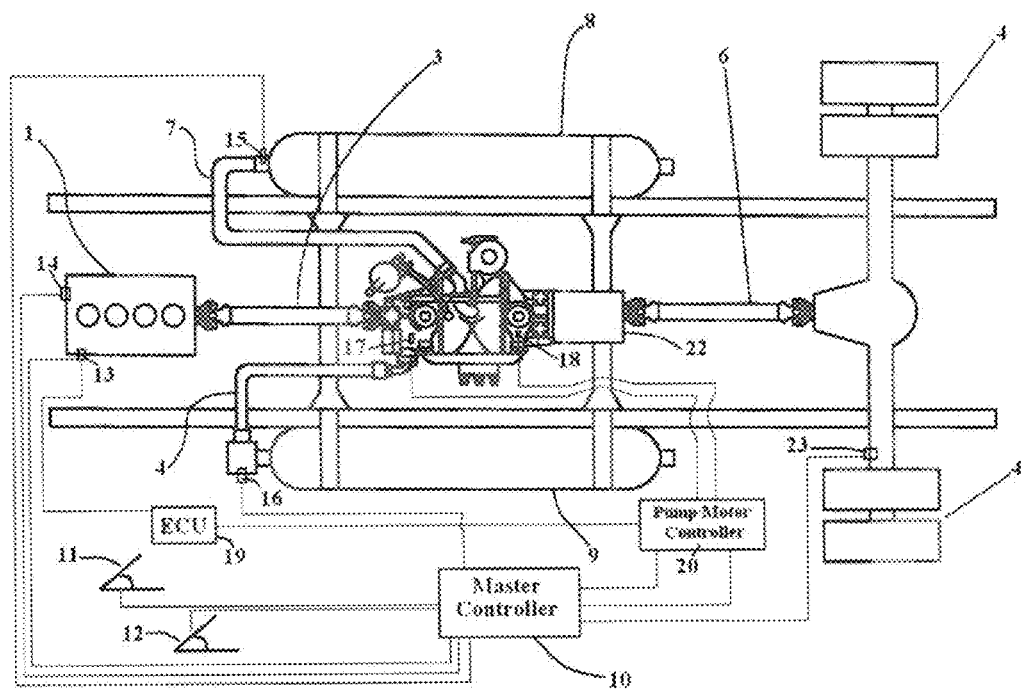
FIG. 1 presents a schematic drawing of a series hydraulic hybrid motor vehicle.

FIG. 1 presents a hydraulic hybrid powertrain for a motor vehicle. Referring to FIG. 1, internal combustion engine 1 operates to drive a hydraulic pump/motor 2 as a hydraulic pump. Pump/motor 2 is shown driven by the engine 1 via driveshaft 3, but could instead be integrated onto the crankshaft (not shown) of engine 1. In pump mode, pump/motor 2 receives low pressure hydraulic fluid from low pressure line 4 and pressurizes the fluid to a higher pressure. This high pressure fluid may then be sent (a) to drive one or more hydraulic pump/motor(s) 5 as motor(s) to provide motive power to the vehicle drive wheels 4 through optional transmission 22 and driveshaft 6, or (b) through high pressure fluid line 7 to high pressure accumulator 8 for energy storage and later reuse of the pressurized working fluid, or (c) to both purposes. A low pressure accumulator 9 provides a reservoir for the low pressure hydraulic fluid.

Figure 5:
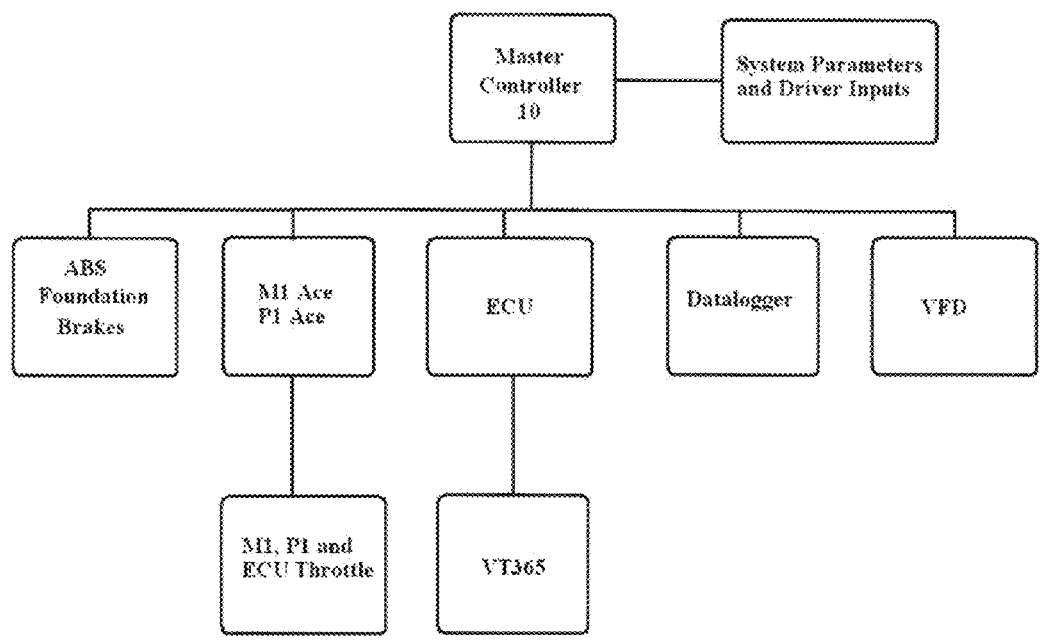
FIG. 5 depicts a controller topology with a modular vehicle control system.

In the preferred embodiment, a master controller 10 receives system pressures (e.g., from pressure sensors 15 and 16 for the high pressure and low pressure sides of the system, respectively), driver inputs (e.g, from accelerator pedal sensor 11 and brake pedal sensor 12), and vehicle conditions (e.g., vehicle speed from vehicle speed sensor 23, engine speed from engine speed sensor 14, fuel quantity from fuel sensor 13, and pump and motor displacement angles from sensors 17 and 18). Master controller 10 directly controls shutoff valves, bilge pump, and other system-level components (all not shown) as well as performing system-level fault detection and recovery. The master controller 10 also directs various slave controllers (including, for example, engine controller 19, pump and motor controller 20) over a CAN network. Various other slave controllers may also be used. Pump/motor slave controller 20 handles hydraulic mode switching, low-level fault detection and interface to sensors 17 and 18 on the pump/motors. The pump/motor slave controller 20 also handles throttle signals to the engine control unit. A sample controller topology is shown as FIG. 5.

Master controller 10 receives signals from the various sensors placed throughout the system, and sends signals to slave controllers (e.g., 19-20) to control operation of various components in the vehicle. For example, accelerator pedal sensor 11 determines driver torque demand by accelerator pedal angle and sends corresponding signals to controller 10. Likewise, brake pedal sensor 12 determines driver braking demand by brake pedal angle or other known means and sends corresponding signals to controller 10. Master controller 10 then controls operation of the vehicle by sending appropriate signals to corresponding slave controllers 19-20 to adjust fuel quantity, change pump and motor displacement angles, change the transmission gear, alter fluid flow by changing valve positions, and/or change pump or motor modes.

The use of slave controllers 19-20 allows for offloading certain responsibilities from the master controller 10 to the slave controllers 19-20, thus allowing controls for certain vehicle functions to be handled in a more modular manner.

In addition to offloading some high speed calculations and fault detection from the master controller 10, the main benefit of a modular, scalable, and portable control system set-up is that it allows the system to more easily be adapted to vehicle-specific implementations. Different vehicle types may have different pump/motor, accumulator and engine capacities, as well as different typical weight and drive cycles. Vehicle fuel efficiency is highly dependent on adjusting control methods for vehicle-specific implementations. The ability to separate generalized control strategies and system logic in the master controller 10, which can remain largely without adjustments between vehicle types, from specific implementation issues that require adjustment of slave controls for the various hydraulic components or engines that may be used with varying vehicle types, saves a significant amount of programming effort. Likewise, as upgrades or changes to the master controller 10 will not necessarily affect slave controllers 19-21, it can save time in making control adjustments in the master controller 10.

A final benefit is that the separation of the controllers into a master and slave arrangement allows for potential continued use of either the master or slaves when the other is down.

Downsides to the arrangement above are the high network load on the master controller 10, the need for more controllers than other possible approaches, and the need to maintain two separate code bases and possibly two development environments.

Figure 2:
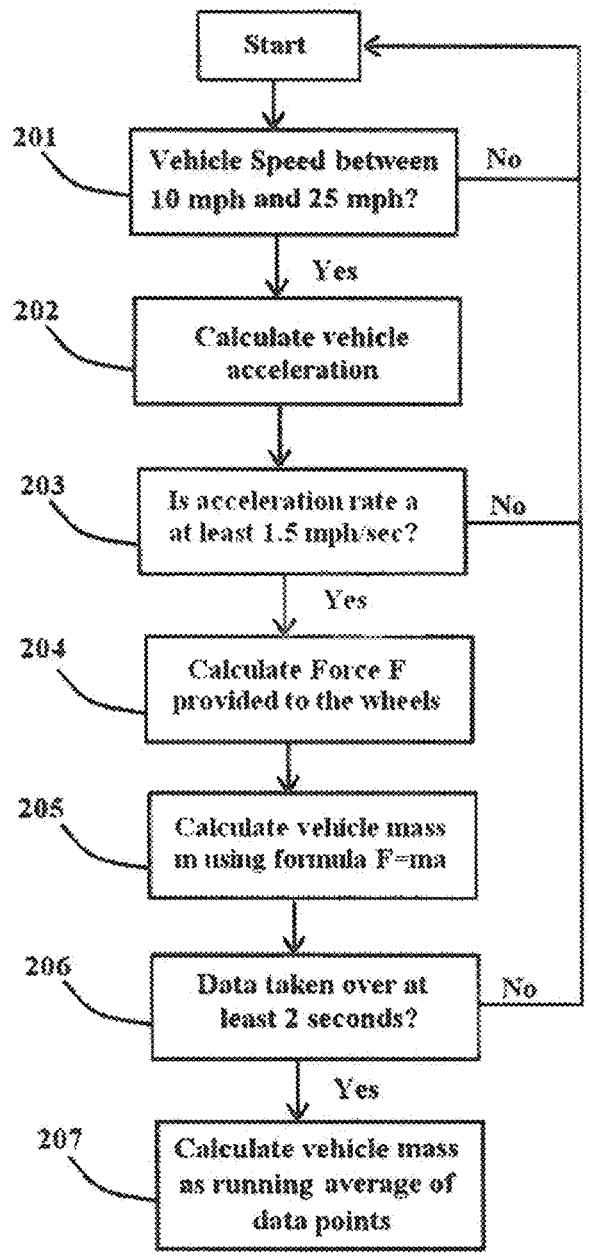
FIG. 2 provides a method for estimating mass for a motor vehicle, according to one embodiment of the invention.

Turning now to the methods of the present invention, FIG. 2 presents a method for estimating vehicle mass in a vehicle. In Step 201 of FIG. 2, it is first determined whether the vehicle is within a preferred window of vehicle speed (e.g., between 10 miles per hour (mph) and 25 mph). This is because a vehicle speed that is too high can result in drag forces skewing the estimate, while a vehicle speed that is too low will result in errors that are large compared to the signals being measured. In Step 202, velocity data provided by vehicle speed sensor 23 is used to calculate acceleration. As indicated in Step 203, if the acceleration rate is less than a desired minimum threshold, e.g., 1.5 mph per second, the data will not be used for vehicle mass estimation. Next, in Step 204, the force provided to the wheels 4 through the hydraulic motor(s) 5 (or an electric motor, for a hybrid electric vehicle) to drive the vehicle forward may also be calculated. Then, in Step 205, using the well-known relationship force=mass*acceleration, the mass of the vehicle can be determined. As indicated in Step 206, if the data could not be taken within the desired vehicle speed range and above the threshold acceleration rate over a window of time that lasted at least 2 seconds, it will not be considered a valid data point. A running average of valid data points is then used to determine the estimated vehicle mass in Step 207.

With regard to FIG. 2, it should be noted that operation of the vehicle on a long grade can throw off the vehicle estimation method above. Therefore, it may be desirable to provide an inclinometer or other means to determine whether the vehicle is on a grade when estimating the vehicle mass.

As mentioned above, braking response and brake pedal feel can be tuned in response to the determined vehicle mass to improve the amount of braking energy captured in operation and to improve driver feel. In a hybrid vehicle, the brake system is generally operated such that the brake pedal is first pushed through a "regeneration" braking zone in a first increment of brake pedal movement before entering a friction brake zone for heavier braking events. See, for example, commonly-assigned U.S. Pat. No. 5,505,527 and U.S. patent application Ser. No. 12/215,438 for two examples of such a braking system for a hydraulic hybrid vehicle.

Figure 3:
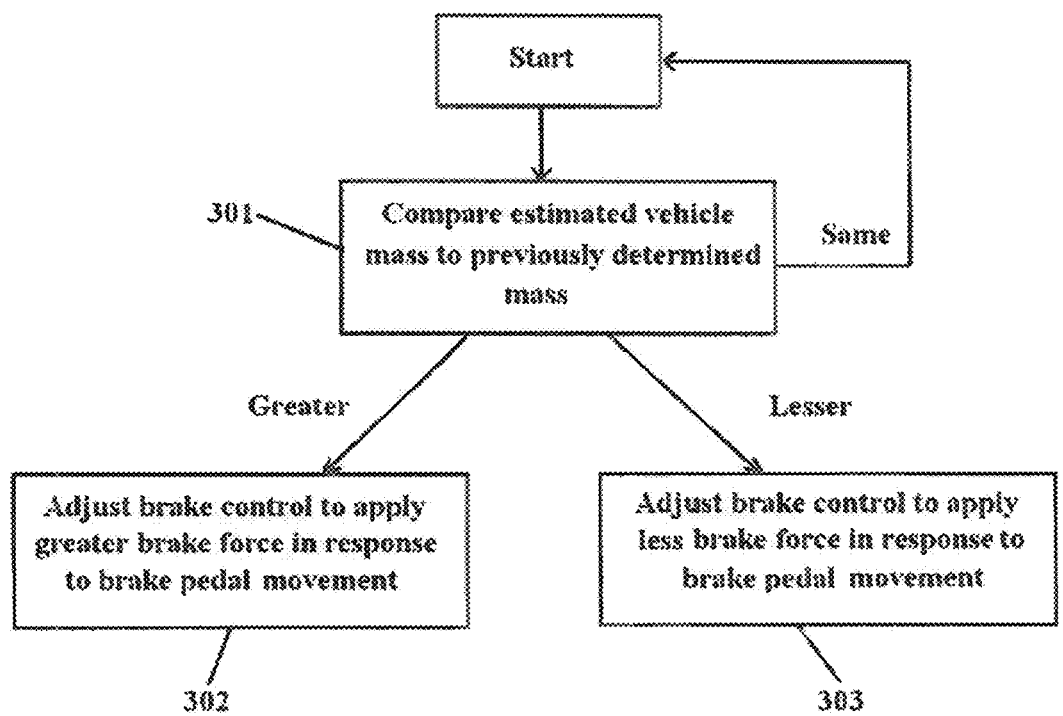
FIG. 3 illustrates a sample method for adjusting brake pedal response in response to changes in vehicle mass, according to one embodiment of the invention.

Referring now to FIG. 3, a method is described for adjusting brake control in response to an increased vehicle weight, such as if the vehicle is loaded with cargo. In Step 301, it is first determined whether the vehicle mass is meaningfully different than previously determined. Differences in vehicle mass can be handled in rough categories (e.g., dividing into heavy vs. light, or into heavy/medium/light categories) if desired, or can be addressed in a more fine-tuned fashion across a continuum of weights. If the estimated vehicle mass is greater than previously determined, greater braking force will be needed to slow the vehicle than when the vehicle was lighter. Therefore, in Step 302, in response to a meaningful increase in vehicle mass, control of the braking system is adjusted to apply greater braking force in response to movement of the brake pedal. In contrast, if the vehicle is lighter than previously determined, the brake controls are adjusted to apply less braking force in response to movement of the brake pedal.

Applicant has observed that if braking control is not adjusted in response to an increase in vehicle weight, in operation the brake pedal will more often be pushed by the driver into the friction braking zone to get sufficient braking force, and therefore more energy is lost to braking. This results in a loss in fuel efficiency. However, by adjusting the brake pedal response to be more sensitive at greater vehicle weights, to trigger greater pumping/regenerative braking, more energy will be captured and greater fuel efficiency will be obtained. In tests conducted by the inventor, the fuel efficiency for heavy hydraulic hybrid vehicles on stop-and-go cycles can be improved by 10% or more by the method described here. It can also be used to keep the pedal and braking feel consistent at different vehicle weights, providing equivalent rates of slowing the vehicle for equivalent pushing of the brake pedal, despite the varying brake force needed for different weights.

Figure 4:
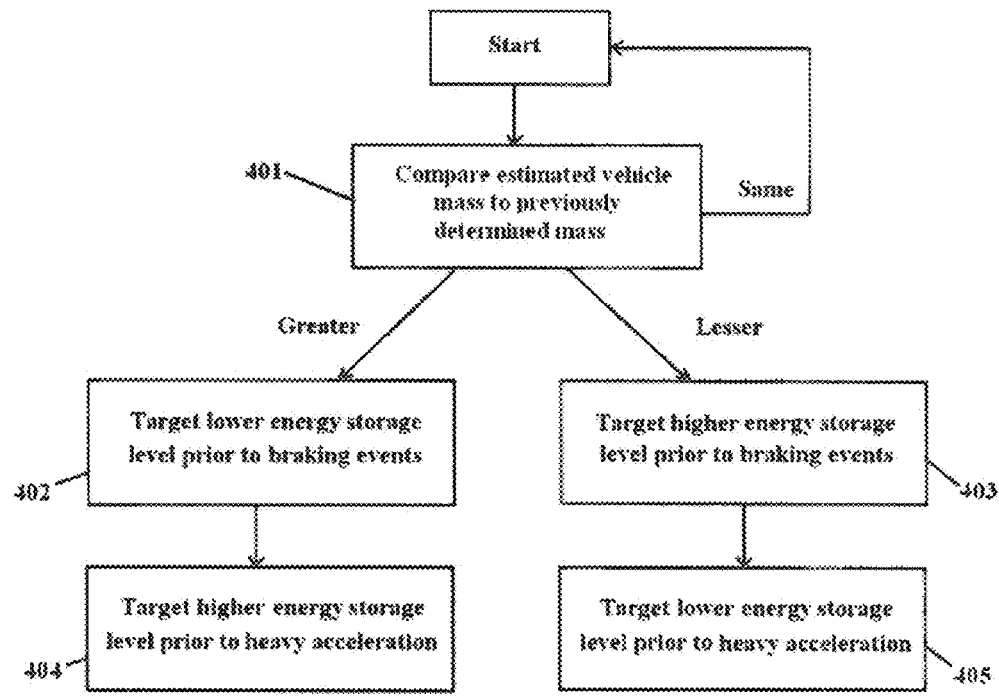
FIG. 4 presents a sample method for adjusting energy storage thresholds or targets responsive to changes in vehicle mass, according to another invention embodiment.

As shown in FIG. 4, it is also possible to use the estimated mass to operate the energy storage levels in the high pressure accumulator 8 (or electric storage battery, for a hybrid electric vehicle) more efficiently. For example, in terms of energy storage levels in the high pressure accumulator 8, it is generally desirable for the high pressure accumulator 8 to be "full" at the end of a stopping event, and to not be full before the stopping event is complete. This provides the maximum recovery of energy and also maximum ability to meet anticipated re-launch needs of the vehicle. As a result, if the vehicle is determined to be heavier than before in Step 401, then in Step 402 the control system is adjusted to target a lower energy storage level prior to anticipated braking events, since braking of the heavier vehicle causes more energy storage to refill the high pressure accumulator, and thus it is desirable to have that capacity available. Conversely, if the vehicle is determined to be lighter than before in Step 401, then in Step 403 the control system is adjusted to target a higher energy storage level prior to anticipated braking events.

Similarly, prior to anticipated significant demand events (e.g., for vehicle launch), it is desirable to have a greater amount of energy stored for a heavier vehicle because of the additional demand that is needed to accelerate a heavier vehicle. As a result, as shown in Step 404, in a heavier vehicle a higher energy storage level is targeted prior to anticipated heavy acceleration events. The opposite adjustment is made when the vehicle is lighter, as indicated in Step 405.

Additional adjustments for vehicle mass may be made to engine operation, such as to engine-off strategies, in order to avoid fuel economy and drivability problems such as too-frequent restarting of the engine. For example, when the vehicle is heavier it may be beneficial to turn the engine on earlier than otherwise.

While the preferred embodiments described herein are discussed primarily in the context of a series hydraulic hybrid vehicle as depicted in FIG. 1, it will be understood that the methods for vehicle mass estimation, the methods for adjusting brake pedal response to changes in vehicle mass, and the methods for adjusting target energy storage levels responsive to changes in vehicle mass, also apply to hybrid electric vehicles with regenerative braking systems. The invention herein is therefore intended to be limited solely by the claims.

I claim:

1. A method for controlling energy storage levels in a hybrid motor vehicle with an on-board energy storage device, comprising:
    determining the overall mass of the vehicle including passengers and cargo by monitoring vehicle acceleration in response to a determined force provided to the vehicle's wheels and thereby calculating the vehicle's mass,
    determining changes in the mass of the vehicle due to changes in passengers or cargo;
    in the event of a change in the mass of the vehicle, adjusting target energy storage levels for the energy storage device; wherein a lower energy storage level prior to anticipated braking events is targeted if the mass of the vehicle has been determined to have increased, and a higher energy storage level prior to anticipated braking events is targeted if the mass of the vehicle has been determined to have decreased, and further comprising determining the overall mass of the vehicle at time periods when the vehicle speed is between 10 mph and 25 mph and the acceleration rate is at least 1.5 mph per second, both for a period of at least 2 seconds.

2. A method for controlling energy storage hydraulic hybrid vehicle with a high pressure accumulator for an on-board energy storage device, comprising:
    determining the overall mass of the vehicle including passengers and cargo by monitoring vehicle acceleration in response to a determined force provided to the vehicle's wheels and thereby calculating the vehicle's mass,
    determining changes in the mass of the vehicle due to changes in passengers or cargo;
    in the event of a change in the mass of the vehicle, adjusting target energy storage levels for the high pressure accumulator; wherein a lower energy storage level prior to anticipated braking events is targeted if the mass of the vehicle has been determined to have increased and a higher energy storage level prior to anticipated braking events is targeted if the mass of the vehicle has been determined to have decreased;
    targeting a higher energy storage level prior to anticipated heavy acceleration events if the mass of the vehicle has been determined to have increased, and targeting a lower energy storage level prior to anticipated heavy acceleration events if the mass of the vehicle has been determined to have decreased; and
    targeting reaching a Full energy storage level in the high pressure accumulator at or near the end of anticipated individual stopping events.

3. A method for controlling regenerative braking and energy storage levels in a hybrid motor vehicle, comprising:
    determining the overall mass of the vehicle including passengers and cargo by monitoring vehicle acceleration in response to a determined force provided to the vehicle's wheels and thereby calculating the vehicle's mass through the relationship force=mass*acceleration,
    determining changes in the mass of the vehicle due to changes in passengers or cargo, and in the event of a change in the mass of the vehicle:
    (i) adjusting the amount of braking force to be applied to the vehicle by the regenerative braking system in response to a given amount of brake pedal movement; wherein greater braking force is applied in response to brake pedal movement if the mass of the vehicle has been determined to have increased, and less braking force is applied in response to brake pedal movement if the mass of the vehicle has been determined to have decreased; and
    (ii) adjusting target energy storage levels for the energy storage device; wherein a lower energy storage level prior to anticipated braking events is targeted if the mass of the vehicle has been determined to have increased, and a higher energy storage level prior to anticipated braking events is targeted if the mass of the vehicle has been determined to have decreased.

* * * * *